United States Patent
Aymeric et al.

(10) Patent No.: US 10,690,925 B2
(45) Date of Patent: Jun. 23, 2020

(54) DUAL HARMONIZATION METHOD AND SYSTEM FOR A WORN HEAD-UP DISPLAY SYSTEM WITH A REMOVABLE ATTITUDE INERTIAL DEVICE IN THE COCKPIT

(71) Applicant: THALES, Courbevoie (FR)

(72) Inventors: Bruno Aymeric, Saint Medard en Jalles (FR); Siegfried Rouzes, Merignac (FR); Bruno Capelle, Merignac (FR); Sébastien Ellero, Pessac (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/219,608

(22) Filed: Dec. 13, 2018

(65) Prior Publication Data
US 2019/0196198 A1    Jun. 27, 2019

(30) Foreign Application Priority Data
Dec. 21, 2017   (FR) ...................... 17 01341

(51) Int. Cl.
*G02B 27/01* (2006.01)
*G01C 23/00* (2006.01)
(Continued)

(52) U.S. Cl.
CPC ....... *G02B 27/0172* (2013.01); *G01C 23/005* (2013.01); *G02B 27/01* (2013.01);
(Continued)

(58) Field of Classification Search
CPC . G02B 2027/0198; G02B 27/01; G06F 3/012; G01S 5/163; G01C 21/165
See application file for complete search history.

(56) References Cited

U.S. PATENT DOCUMENTS

| 9,891,705 B1* | 2/2018 | Lahr | G06F 3/012 |
| 2019/0041979 A1* | 2/2019 | Kirchner | G01P 15/08 |

FOREIGN PATENT DOCUMENTS

| WO | 2009/081177 A2 | 7/2009 |
| WO | 2015/165838 A1 | 11/2015 |

OTHER PUBLICATIONS

Tuceryan, et al., "Single point active alignment method (SPAAM) for optical see-through HMD calibration for AR", Proceedings of the IEEE and ACM International Symposium of Augmented Reality, pp. 149-158, Munich, Germany, Oct. 5, 2000.

(Continued)

*Primary Examiner* — Kenneth J Malkowski
(74) *Attorney, Agent, or Firm* — Baker & Hostetler LLP (57) ABSTRACT

A dual harmonization method for a worn head-up display system for making the display of piloting information of an aircraft on a display conform with the outside real world includes a step of acquisition of N measurements $\hat{K}_t$ of head posture detection by a series of sightings Vi corresponding to images oriented according to orientations Oi of one and the same photograph taken by a camera, secured to and aligned with the attitude inertial device D3, then a step of joint computation of the matrices of relative orientation M01 and M23 as joint solutions of the dual harmonization $\hat{U}_i = \hat{G} \cdot \hat{K}_i \cdot \hat{D}$, i varying from 1 to N, in which $\hat{U}_t$ is the transpose of the matrix M(image(i)/0) of relative orientation of the image(i) of rank i relative to the display D0, with M01 and M23 respectively equal to the right and left matrices $\hat{D}$ and $\hat{G}$. A worn head-up display system is configured to implement the dual harmonization method.

12 Claims, 3 Drawing Sheets

(51) Int. Cl.
*G06F 3/01* (2006.01)
*G05D 1/10* (2006.01)
*G06K 9/00* (2006.01)

(52) U.S. Cl.
CPC ............. *G05D 1/101* (2013.01); *G06F 3/011* (2013.01); *G06F 3/012* (2013.01); *G06K 9/00671* (2013.01)

(56) References Cited

OTHER PUBLICATIONS

Janin, et al., "Calibration of head-mounted displays for augmented reality applications", Proceedings of IEEE Virtual Reality Annual International Symposium, pp. 246-255, Sep. 18, 1993.

Genc, et al., "Practical Solutions for Calibration of Optical See-Through Devices", Proceedings, International Symposium on Mixed and Augmented Reality, Sep. 30, 2002.

Grubert, et al., "A Survey of Calibration Methods for Optical See-Through Head-Mounted Displays", IEEE Transactions on Visualization and Computer Graphics, vol. 24, Issue: 9, Sep. 13, 2017.

* cited by examiner

DUAL HARMONIZATION METHOD AND SYSTEM FOR A WORN HEAD-UP DISPLAY SYSTEM WITH A REMOVABLE ATTITUDE INERTIAL DEVICE IN THE COCKPIT

CROSS-REFERENCE TO RELATED APPLICATIONS

This application claims priority to foreign French patent application No. FR 1701341, filed on Dec. 21, 2017, the disclosure of which is incorporated by reference in its entirety.

FIELD OF THE INVENTION

The present invention relates to a method for dual harmonization for a worn head-up display system for making the display of piloting information of an aircraft conform with the outside real world.

The invention lies in the technical field of the piloting human-system interface (HSI) for aircraft, such as, for example, helicopters or aeroplanes, equipped with a worn head-up or helmet-mounted display system (Head Worn Display HWD or Helmet Mounted Display HMD) and a head posture detection device DDP.

BACKGROUND

The head-up display devices, whether worn or not, make it possible to display in particular a "symbology" conforming to the outside world, that is to say a set of symbols whose position in front of the eye or the pilot allows for a superimposition with the corresponding elements in the outside real world. It can be for example a speed vector, a target on the ground such as a symbol representing a landing runway, a synthetic representation of the terrain or even a sensor image.

This conformal display requires knowledge of the position and of the attitude of the aircraft and, for head-worn display devices, the attitude of the display relative to a fixed reference linked to the aircraft. These different positions and attitudes are supplied by the avionics systems for those of the aircraft, and by the posture detection device DDP for those of the display.

For example and in particular, the avionics systems for supplying the position and the attitude of an aircraft can be:

a global positioning device of GPS (Global Positioning System) type; and an inertial reference system IRS based on gyroscopes and accelerometers of MEMS (Microelectromechanical Systems) type or on a laser gyroscope, or an attitude and heading reference system AHRS.

As is known, a harmonization of the head-up display system is performed on installation of a head-up display system, worn or not worn, in the cockpit in order to compute the correction of angles to be made to switch from the display reference frame to the aircraft reference frame, and in order to obtain a conformal head-up display.

To date and as is known, the avionics system for supplying the attitude of the aircraft relative to the Earth, hereinafter called attitude inertial device, is:

rigidly secured to the platform of the aircraft, which requires a lengthy harmonization procedure to align said attitude inertial device on said platform, or attached to the fiducial device linked to the platform, which also requires a lengthy harmonization procedure to align said fiducial device on the platform of the aircraft.

Many platforms of aircraft such as, for example, helicopters or light aeroplanes are not these days equipped with conventional inertial means for supplying their own attitude relative to the Earth but recently it has become possible to use small inertial equipment items capable of suppling the pilot with this attitude information with relatively correct performance levels. These equipment items can easily be packaged in removable modules that can be "attached by suction", that is to say fixed using a sucker, onto the windshield of the supporting structure of the cockpit. Such inertial equipment items of small size also include a device for supplying the position of the equipment item and therefore of the aircraft.

According to a first drawback, the removable nature of this inertial equipment item with a new fixing configuration each time said inertial equipment item is moved requires the implementation of a procedure for a new humanization of the conformal display system that is accurate and rapid.

According to a second drawback, this inertial equipment item knows the heading of the aircraft with relatively little accuracy in the absence of movement of the platform. Indeed, the presence of a positioning device, of GPS type, incorporated in the equipment of item, and of hybridation algorithms, make it possible to refine the knowledge of the heading during the changes in the movement of the aircraft, but on the ground, before take-off, the value known for the heading is relatively incorrect.

A first technical problem is how to provide a worn head-up display system for making the display of piloting information of an aircraft conform with the outside real world and the method for mutual harmonization of the elements of said head-up display system which make it possible to rapidly and accurately know the relative orientation of the attitude inertial device of the removable inertial equipment item, that can easily be moved, relative to the fixed fiducial element linked to the platform, also constituting the fixed element of the posture detection subsystem DDP.

A second technical problem is how to provide a worn head-up display system and a harmonization method which make it possible to rapidly and accurately know the relative orientation of the attitude inertial device of the removable inertial equipment item, that can easily be moved, relative to the fixed fiducial element linked to the platform, and the relative orientation of the display of the worn head-up display system relative to the mobile tracking element of the posture detection subsystem DDP.

A third technical problem is how to provide a head-up display system for making the display of piloting information of an aircraft conform with the outside real world and a harmonization method which makes it possible to rapidly and accurately know the relative orientation of the attitude inertial device of the removable inertial equipment item, that can easily be moved, relative to the platform of the aircraft.

SUMMARY OF THE INVENTION

To this end, the subject of the invention is a dual harmonization method for a worn head-up display system for making the display of piloting information of an aircraft on a display conform with the outside real world, the worn head-up display system comprising: a transparent worn head-up display D0; a head posture detection subsystem DDP having a mobile tracking first element D1 securely attached to the transparent display D0, a fixed second element D2 securely linked to the platform of the aircraft, and a means for measuring and determining the relative orientation M12 of the mobile tracking first element D1 relative to a reference frame of the fixed second element D2 linked to the platform; an attitude inertial device D3 for supplying the relative attitude M3t of the platform relative to a terrestrial reference frame linked to the Earth, removable and that can be securely fixed to the platform on a windshield of the cockpit for any period of operation of the aircraft; a harmonization subsystem for the worn head-up display system for making the display of piloting information on the display D0 conform with the outside real world, the harmonization subsystem having a harmonization computer and a human-system interface for managing and performing the implementation of the dual harmonization method.

The dual harmonization method is characterized in that it comprises a first step of provision of an augmented inertial equipment item D3p+ securely incorporating, in one and the same assembly, the attitude inertial device D3 of the aircraft, and a camera for taking one or more photos of the outside real world, the camera and the attitude inertial device D3 of the aircraft being securely linked; a second step of acquisitions of measurements $\hat{K}_t$ in which a series of an integer number N, greater than or equal to 3, of different sightings Vi are performed, i varying from 1 to N, performed through the semi-transparent display D0, by aligning, with the outside real world, different images of rank i, denoted by image(i), fixed on said display D0, and each representing one and the same photo, taken before the first sighting V1 by the camera of the augmented inertial equipment item D3p+, seen with a predetermined different angular orientation Oi, expressed in terms of three Euler angles of bearing, pitch and roll, corresponding to a matrix M(image(i)/0) from the reference frame "image(i)" of the image of rank i to the reference frame "0" of the display D0, and in which, for each sighting Vi performed, i varying from 1 to N, the posture detection subsystem DDP measures and determines the corresponding relative orientation $\hat{K}_t$ of the tracking first element D1 relative to the fixed second element D2, linked to the platform of the aircraft; then a third step in which the dual harmonization computer jointly computes the matrix of relative orientation M01 between the display D0 in a tilted position and the tracking first element D1 and the matrix of relative orientation M23 between the second element D2 of the posture detection subsystem DDP and the attitude inertial device D3 as, respectively, the right matrix $\hat{D}$ and the left matrix $\hat{G}$, joint solutions of the harmonization equations: $\hat{U}_i = \hat{G} \cdot \hat{K}_i \cdot \hat{D}$, i varying from 1 to N, in which $\hat{U}_t$ is the transpose of the matrix M(image(i)/0).

According to particular embodiments, the dual harmonization method for a worn head-up display system comprises one or more of the following features, taken alone or in combination:

the minimum of the number of measurements N required depends on the number L of degrees of angular freedom of the rotations M01 and M3t of the display system HMD that are errored or unusable, said number L being an integer greater than or equal to 1 and less than or equal to 6, the solving of the system of equations $\hat{U}_i = \hat{G} \cdot \hat{K}_i \cdot \hat{D}$, i varying from 1 to N uses a rectification operator $\pi(.)$ which transforms any matrix A into a 3×3 square matrix of rotation $\pi(A)$ that is as close as possible to the least squares sense over all the terms of the matrix $\pi(A)-A$ over all of the 3×3 rotation matrixes to determine the rotation to right $\hat{D}$ and the rotation to the left $\hat{G}$;

the number N is greater than or equal to 3, and the third step of solving of the dual harmonization system of equations comprises a first set of substeps consisting in: in a first substep, choosing a "pivot" measurement as being the first measurement out of the N measurements and corresponding to i equal to 1, and for i=2, ..., N the matrices of rotations $\hat{U}_{1,i}$ and $\hat{K}_{1,i}$ are computed using the equations: $\hat{U}_{1,i} = \hat{U}_1^T \cdot \hat{U}_i$ and $\hat{K}_{1,i} = \hat{K}_1^T \cdot \hat{K}_i$; then, in a second substep, determining, for i=2, ..., N, the main unitary vectors of the rotations $\hat{U}_{1,i}$ and $\hat{K}_{1,i}$, denoted respectively by $\vec{u}_i$ and $\vec{k}_i$; then in a third substep, computing the right matrix $\hat{D}$, i.e. M01, using the equation:

$\hat{D} = \pi(\Sigma_{i \geq 2} (\vec{k}_i \cdot \vec{u}_i^T))$ then, in a fourth substep, determining the matrix of rotation to the left $\hat{G}$; i.e. M23, from the matrix $\hat{D}$ computed in the third substep (238), using the equation:

$\hat{G} = \pi(\Sigma_{i \geq 1}(\hat{U}_i \cdot \hat{D}^T \cdot \hat{K}_i^T))$;

the worn head-up display system also comprises an aircraft positioning device Dp; and the dual harmonization method comprises a fourth step of determination of the relative orientation M(pl/3) of the platform of the aircraft relative to the attitude inertial device D3, the fourth step of determination of the relative orientation M(pl/3) comprising a second set of substeps consisting in: in a fifth substep, placing the platform of the aircraft horizontal and computing a matrix M(pl1/3) of which the relative bearing is unknown for compensating the relative angles of pitch and of roll between the attitude inertial device D3 and the platform such that:

M(3/t)*M(pl1/3)=M(p/t), M(p/t) being a matrix of theoretical relative orientation of the platform relative to the Earth comprising only a bearing component and for which the pitch angle and the roll angle are nil, and M(3/t) being a matrix of relative orientation for the platform relative to the Earth measured by the attitude inertial device D3; then, in a sixth substep, determining the bearing of a point of note in the landscape, situated far in front and in view of the camera and for which the latitude and the longitude are known, relative to the attitude inertial device D3 by using the camera of the augmented inertial device D3p+, by taking a photograph with the camera 52 and transferring the photograph to the harmonization computer, then by processing the photograph by noting the position of the point of note, and by determining the bearing of the point of note relative to the camera, and therefore relative to the attitude inertial device D3, from the knowledge of the pitch and of the roll supplied by the attitude inertial device, and from the knowledge of the matrix of relative orientation M(pl/3) of the platform of the aircraft relative to the attitude inertial device D3; then, in a seventh substep, determining the bearing of the point of note relative to the platform from the knowledge of the latitude and longitude of the point of note, from the latitude and the longitude of the platform and from the angle of the heading of the platform, supplied by a means for accurately supplying the heading of the platform; then, in an eighth step, deducing therefrom the bearing of the attitude inertial device D3 relative to the platform, adding to the matrix M(pl1/3) to obtain the matrix M(pl/3) giving the relative orientation of the attitude inertial device D3 relative to the platform of the aircraft; then, in a ninth substep, determining the relative orientation of the fixed second element D2 of the posture detection subsystem DDP relative to the platform (24) from the relative orientation M23 of the fixed second element D2 of the posture detection subsystem DDP relative to the attitude inertial device D3, supplied by the third step, and from the matrix M(pl/3) giving the relative orientation of the attitude inertial device D3 relative to the platform, supplied by the seventh substep;

the sixth substep consists in: positioning the horizontally-placed platform on a compass card and positioning the platform such that a point of note in the landscape, situated far from the compass card and of which the latitude and the longitude are known, is in view of the camera of the augmented inertial equipment item D3p+, taking a photograph by the camera and transferring the photograph to the harmonization computer; then processing the photograph by noting the position of the point of note, and determining the bearing of the point of note relative to the camera, and therefore relative to the attitude inertial device D3, from the knowledge of the pitch and of the roll supplied by the attitude inertial device, and from the knowledge of the matrix of relative orientation M(pl/3) of the platform of the aircraft relative to the attitude inertial device D3; and the seventh substep consists in determining the bearing of the point of note relative to the platform from the knowledge of the latitude and longitude of the point of note, from the latitude and the longitude of the platform and from the angle of the heading of the platform read on the compass card.

Another subject of the invention is a worn head-up display system for making the display of piloting information of an aircraft on a display conform with the outside real world, comprising: a transparent worn head-up display system D0; a head posture detection subsystem DDP having a mobile tracking first element D1 securely attached to the transparent display D0, a fixed second element D2 securely linked to the platform of the aircraft, and a means for measuring and determining the relative orientation M12 of the mobile tracking first element D1 relative to a reference frame of the fixed second element D2 linked to the platform; an attitude inertial device D3 for supplying the relative attitude M3t of the platform relative to a terrestrial reference frame linked to the Earth, removable and capable of being fixed securely to the platform on a windshield of the cockpit for any period of operation of the aircraft; a harmonization subsystem for the worn head-up display system for making the display of pilot information on the display D0 conform with the outside real world, the harmonization subsystem having a dual harmonization computer and a human-system interface for managing and performing the implementation of the dual harmonization method.

The worn head-up display system is characterized in that the harmonization subsystem also comprises a camera for taking one or more photos of the outside real world, and attitude inertial device D3 of the aircraft, and the camera are incorporated together in an augmented inertial equipment item D3p+, the augmented inertial equipment item D3p+ being able to be moved and capable of being fixed rapidly and easily, and the camera and the attitude inertial device D3 of the aircraft being securely linked.

According to particular embodiments, the worn head-up display system comprises one or more of the following features, taken alone or in combination:

the harmonization subsystem is configured to: in a second step of acquisitions of measurements $\hat{K}_t$, perform a series of an integer number N, greater than or equal to 3, of different sightings Vi, i varying from 1 to N, through the semi-transparent display D0, by aligning, with the outside real world, different images of rank i, denoted image(i), fixed on said display D0, and each representing one and the same photo, taken before the first sighting V1 by the camera of the augmented inertial equipment item D3p+, seen with a pre-determined different angular orientation Oi, expressed in terms of three Euler angles of bearing, pitch and roll, corresponding to a matrix M(image(i)/0) from the reference frame "image(i)" of the image of rank i to the reference frame "0" of the display D0, and, for each sighting Vi performed, i varying from 1 to N, measuring and determining, by the posture detection subsystem DDP, the corresponding relative orientation $\hat{K}_t$ of the tracking first element D1 relative to the fixed second element D2, linked to the platform of the aircraft; then, in a third step, computing, using the harmonization computer, the matrix of relative orientation M01 between the display D0 in a tilted position and the tracking first element D1 and the matrix of relative orientation M23 between the fixed second element D2 of the posture detection subsystem DDP and the attitude inertial device D3 as, respectively, the right matrix $\hat{D}$ and the left matrix, $\hat{G}$ joint solutions of the dual system of harmonization equations: $\hat{U}_i = \hat{G} \cdot \hat{K}_i \cdot \hat{D}$, i varying from 1 to N, in which $\hat{U}_i$ is the transpose of the matrix M(image(i)/0);

the minimum of the number of measurements N required depends on the number L of degrees of angular freedom of the rotations M01 and M3t of the display system HMD that are errored or unusable, said number L being an integer greater than or equal to one and less than or equal to 6, and the harmonization computer is configured to solve the system of equations $\hat{U}_i = \hat{G} \cdot \hat{K}_i \cdot \hat{D}$, i varying from 1 to N, in the third step by using a rectification operator $\pi(.)$ which transforms any matrix A into a 3×3 square matrix of rotation $\pi(A)$ that is as close as possible to the least squares sense over all of the terms of the matrix $\pi(A)-A$ over all of 3×3 rotation matrices to determine the rotation to the right $\hat{D}$ and the rotation to the left $\hat{G}$;

the number N is greater than or equal to 3, and the third step of solving of the dual harmonization system of equations implemented by the harmonization computer comprises a first set of substeps consisting in: in a first substep, choosing a "pivot" measurement as being the first measurement out of the N measurements and corresponding to i equal to 1, and for i=2, ..., N the matrices of rotations $\hat{U}_{1,i}$ and $\hat{K}_{1,i}$ are computed using the equations: $\hat{U}_{1,i} = \hat{U}_1^T \cdot \hat{U}_i$ and $\hat{K}_{1,i} = \hat{K}_1^T \cdot \hat{K}_i$; then, in a second substep, determining, for i= 2, ..., N, the main unitary vectors of the rotations $\hat{U}_{1,i}$ and $\hat{K}_{1,i}$, denoted respectively by and $\vec{u}_i$ and $\vec{k}_i$; then, in a third substep, computing the right matrix $\hat{D}$, i.e. M01, using the equation:

$$\hat{D} = \pi\left(\sum_{i \geq 2} (\vec{k}_i \cdot \vec{u}_i^T)\right)$$

then, in a fourth substep, determining the left matrix of rotation $\hat{G}$; i.e. M23, from the matrix $\hat{D}$ computed in the third substep, using the equation: $\hat{G} = \pi(\Sigma_{i \geq 1}(\hat{U}_i \cdot \hat{D}^T \cdot \hat{K}_i^T))$;

the worn head-up display system also comprises an aircraft positioning device Dp and the harmonization computer and the human-system interface of the harmonization subsystem are configured to implement a fourth step of determination of the relative orientation M(pl/3) of the platform of the aircraft relative to the attitude inertial device D3, the fourth step of determination of the relative orientation M(pl/3) comprising a second set of substeps consisting in: in a fifth substep, placing the platform of the aircraft horizontally and computing a matrix M(pl1/3) for which the relative bearing is unknown for compensating relative pitch and roll angles between the attitude inertial device D3 and the platform such that: M(3/t)*M(pl1/3)=M(p/t), M(p/t) being a matrix of theoretical relative orientation of the platform relative to the Earth comprising only a bearing component and for which the pitch angle and the roll angle are nil, and M(3/t) being a matrix of relative orientation of the platform relative to the Earth measured by the attitude inertial device D3; then, in a sixth substep, determining the bearing of a point of note in the landscape, situated far in front and in view of the camera 52 and for which the latitude and the longitude are known, relative to the attitude inertial device D3 by using the camera of the augmented inertial device D3p+, by taking a photograph by the camera and transferring the photograph to the harmonization computer, then by processing the photograph by noting the position of the point of note, and by determining the bearing of the point of note relative to the camera, and therefore relative to the attitude inertial device D3, from the knowledge of the pitch and of the roll supplied by the attitude inertial device, and from the knowledge of the matrix of relative orientation M(pl/3) of the platform of the aircraft relative to the attitude inertial device D3; then, in a seventh substep, determining the bearing of the point of note relative to the platform from the knowledge of the latitude and the longitude of the point of note, from the latitude and the longitude of the platform and from the angle of the heading of the platform supplied by a means for accurately supplying the heading of the platform; then, in an eighth step, by deducing the bearing of the attitude inertial device D3 relative to the platform, adding to the matrix M(pl1/3) to obtain the matrix M(pl/3) giving the relative orientation of the attitude inertial device (30) D3 relative to the platform of the aircraft; then, in a ninth substep, determining the relative orientation of the fixed second element D2 of the posture detection subsystem DDP relative to the platform from the relative orientation M23 of the fixed second element D2 of the posture detection subsystem DDP relative to the attitude inertial device D3, supplied by the third step, and from the matrix M(pl/3) giving the relative orientation of the attitude inertial device D3 relative to the platform, supplied by the seventh substep;

the sixth substep consists in: positioning the horizontally-placed platform on a compass card and positioning the platform such that a point of note in the landscape, situated far from the compass card and for which the latitude and the longitude are known, is in view of the camera of the augmented inertial equipment item D3p+, taking a photograph by the camera and transferring the photograph to the harmonization computer, then processing the photograph by noting the position of the point of note, and by determining the bearing of the point of note relative to the camera, and therefore relative to the attitude inertial device D3, from the knowledge of the pitch and of the roll supplied by the attitude inertial device, and from the knowledge of the matrix of relative orientation M(pl/3) of the platform of the aircraft relative to the attitude inertial device D3; and the seventh substep consists in determining the bearing of the point of note relative to the platform from the knowledge of the latitude and longitude of the point of note, from the latitude and the longitude of the platform and from the angle of the heading of the platform read on the compass card;

the augmented inertial equipment item D3p+ comprises a fixing device of sucker type.

BRIEF DESCRIPTION OF THE DRAWINGS

The invention will be better understood on reading the following description of several embodiments, given purely by way of example and with reference to the drawings in which.

DETAILED DESCRIPTION

The basic principle of the head-up display system and of the joint dual harmonization method according to the invention rests on:

the augmentation of the removable inertial equipment item, incorporating the attitude inertial device and the aircraft positioning inertial device, by the addition of a camera whose optical axis is secured to one of the axes of the attitude inertial device;

the use of said camera and of the posture detection subsystem DDP of the head-up display system to form a series of dual harmonization sightings Vi;

the use of an algorithm for joint solving of two left and right matrices, $\hat{G}$ et $\hat{D}$, of a dual harmonization system of equations.

Figure 1:
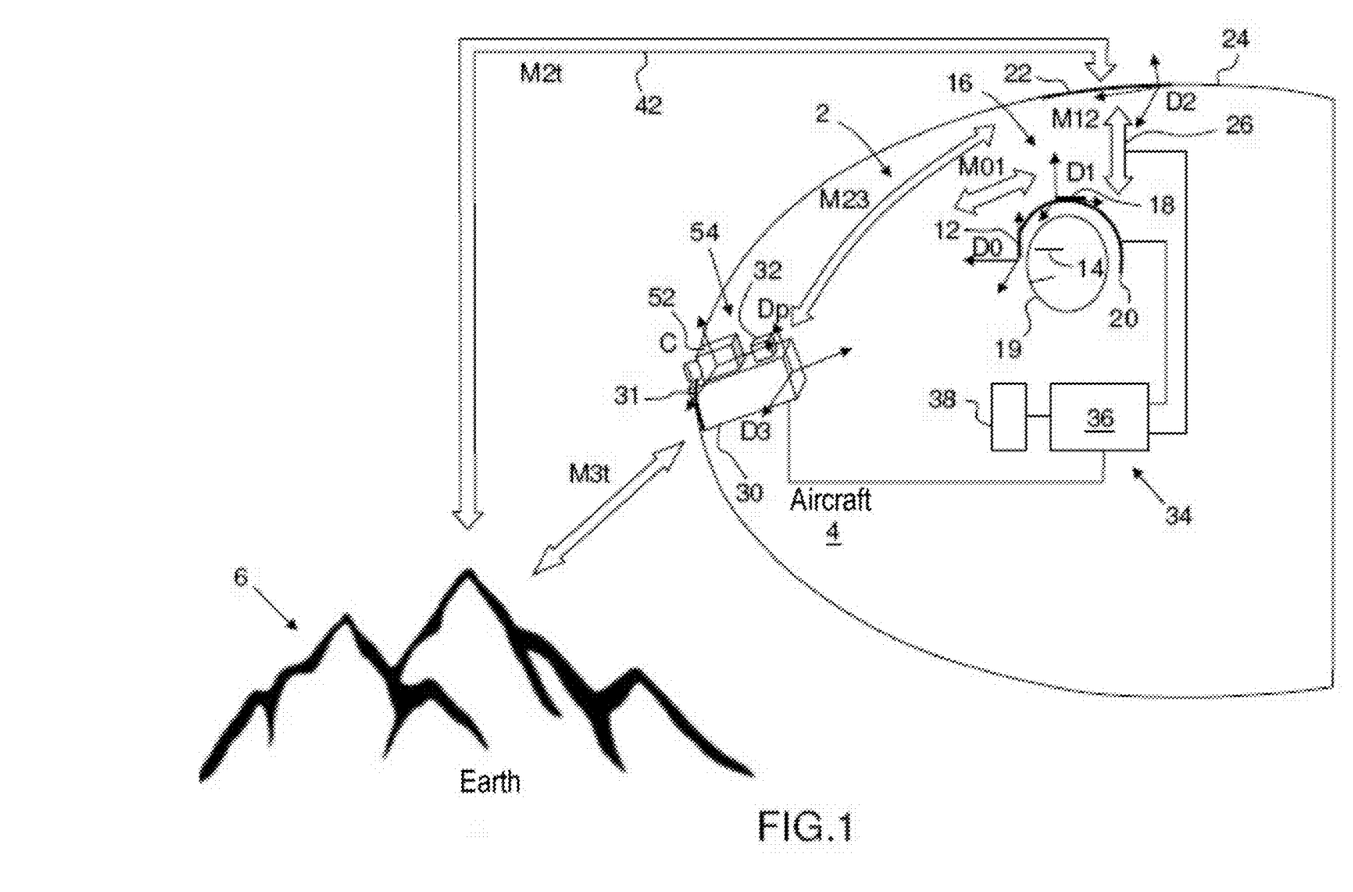
FIG. 1 is a view of a worn head-up display system according to the invention for making the display of piloting information of an aircraft on a display conform with the outside real world in which the attitude inertial device of the aircraft can easily be moved in the cockpit of said aircraft and requires a new harmonization of the display system.

According to FIG. 1, a head-up display system 2 according to the invention for making the display of piloting information of an aircraft 4 on a display conform with the outside real world 6 comprises the following devices:

a display device or transparent worn head-up display 12, denoted D0, positioned in front of the eye 14 of a pilot and being able to serve as visor therefor, for example a lens;

a posture detection subsystem 16 DDP, having a mobile tracking first element 18, denoted D1, rigidly attached to the head 19 or to the helmet 20 of the pilot and rigidly attached to the display D0 when the display D0 is placed in the field of view of the pilot, a fixed second element 22 D2, securely linked to the platform 24 (also denoted by "pl") of the aircraft 4 and serving as reference frame with respect to the posture detection subsystem 16 DDP, and a means 26 for measuring and determining the relative orientation M12 of the mobile tracking first element 18 D1 relative to a reference frame of the fixed second element 22 D2 linked to the platform, an attitude inertial device 30 D3, for example an inertial station AHRS, supplying the relative attitude M3t of the platform relative to a terrestrial reference frame "t" linked to the Earth, that can be rapidly removed and that can be easily and securely fixed to the platform 24 in the cockpit, for example on a windshield of the cockpit using a fixing device 31 of sucker type, for any period of operation of the aircraft, a device 32 Dp for supplying the position of the aircraft relative to the terrestrial reference frame linked to the Earth, for example a satellite positioning system of GPS type or a radio navigation system;

a dual harmonization subsystem 34 for the head-up display system 2 for making the display of piloting information on the display D0 conform with the outside real world, the harmonization subsystem having a dual harmonization computer 36 and a human-system interface 38 for managing and performing the implementation of the dual harmonization method.

The dual harmonization computer 36 can be an electronic computer, dedicated specifically to the implementation of the dual harmonization method, or a more general-purpose electronic computer provided to also implement other functions of the head-up display system 2.

Similarly, the human-system interface 38 can be a human-system interface dedicated only to the performance of the dual harmonization method or a more general human-system interface shared with other functions of the head-up display system.

The display system also comprises a means 42 for defining, measuring or determining the relative angular orientation M2t of the fixed second element 22 D2 relative to the Earth.

This means 42 uses the data from the attitude inertial device D3, attached to the platform of the aircraft and configured to measure its own orientation M3t relative to the Earth, and the relative angular orientation M23 of the fixed second element 22 D2 fixed to the posture detection subsystem 16 DDP relative to the attitude inertial device D3, this relative orientation M23 being determined by the dual harmonization method of the present invention.

The conformal piloting information comprises, for example, a speed vector, a target on the ground, a synthetic representation of the terrain or even an image from an electromagnetic sensor, for example from an infrared sensor.

It is noteworthy that, in the current state of the art of head-up display systems, the posture detection subsystem 16 DDP is relatively complex in practice because it implements two measurements:

an inertial measurement of the relative angular orientation M2t of the second fixed element D2 relative to the Earth, and a direct measurement of the relative orientation of the first mobile tracking element D1 relative to the fixed second element D2, often in the form of image processing, and uses the knowledge of the relative orientation M2t of the fixed second element D2 relative to the Earth. However, while this particular feature makes the algorithms more complex, this particular feature has no impact on the head-up display system and the dual harmonization method of the present invention, and it will consequently be possible to consider that the relative orientation M12 of the tracking first element D1 relative to the fixed second element D2 is simply supplied by a direct measurement of the posture detection subsystem DDP.

Here, and according to a preferred embodiment hereinbelow, the posture detection subsystem 16 DDP is configured to supply raw DDP output data derived as a priority from the direct optical measurements of the relative orientation between the tracking first element D1 relative to the fixed second element D2.

Consequently, the means Mij that make it possible to know the relative orientation of one reference frame "i" relative to another "j" are likened hereinbelow in this document to the matrix describing this orientation. Indeed, the orientation Mij of one reference frame relative to another can be described equally by:

three angles called Euler angles, which, conventionally in aeronautics, correspond to the order of rotation for these following angles:

Bearing: rotation about the axis z which is oriented downward (or towards the Earth);

Pitch: rotation about the axis y which is oriented to the right (or to the east of the Earth);

Roll: rotation about the axis x which is oriented towards the front (or towards the north of the Earth);

a 3×3 matrix describing this rotation.

Hereinbelow, the matrix Mij will be able to be also denoted M(i/j), the matrix Mij or M(i/j) describing the relative orientation of the reference frame "i" relative to "j" (or of "i" to "j"). If vi is the expression of a vector in the reference frame "i" and vj the expression of this vector in the reference frame "j", then the relationship is obtained. Consequently there is the relationship: $vi=M(i/j)*vj$ and the transition relationship between reference frames: $M(i/k)$ (from i to k)=$M(j/k)*M(i/j)$.

The dual harmonization subsystem 14 also comprises a camera 52 for taking one or more photos of the outside real world.

The attitude inertial device 30 D3 of the aircraft, the positioning device 32 Dp of the aircraft and the camera 52 are incorporated together and form an augmented inertial equipment item 54 D3$p$+.

The attitude inertial device 30 D3 of the aircraft and the camera 52 are securely linked such that the relative orientation of their associated reference frames is permanently constant. In other words, the rotation matrix of transition from the reference frame attached to the camera 52 to the reference frame attached to the attitude inertial device 30 D3 is invariant in time. In particular this rotation matrix is the identity matrix.

The attitude inertial device 32 D3 and the positioning device Dp of the aircraft are not necessarily securely linked.

As a variant, the attitude inertial device D3 and the positioning device Dp of the aircraft may not be incorporated together in an augmented inertial equipment item D3$p$+ only the attitude inertial device D3 and the camera then being incorporated together in one and the same augmented inertial equipment item D3+.

The augmented inertial equipment item 54 D3$p$+ or D3$p$ can be moved and can be fixed rapidly and easily.

The camera 52, the aircraft positioning device Dp, the attitude inertial device D3, and the human-system interface 38 HSI are connected to the dual harmonization computer 36.

The augmented inertial equipment item 54 D3$p$+ thus forms a removable assembly or module that can be fixed onto the windshield of the cockpit using the fixing device 31, for example of "sucker" type, of the attitude inertial device 30 D3.

The use of a camera 52, incorporated with the attitude inertial device 30 D3 in the augmented inertial equipment item 54 D3$p$+, and the use of the first embodiment of the joint dual harmonization method for a posture detection subsystem DDP, described in the patent application entitled "Dual harmonization method for a posture detection subsystem DDP incorporated in a worn head-up display system" and filed on the same date as the present application, make it possible, through a simple series of a number N, greater than or equal to 3, of sightings Vi on the outside real world, corresponding to images oriented according to orientations Oi of one and the same photograph taken by the camera, secured and assumed aligned during a calibration done in the factory with the attitude inertial device D3, to know accurately, rapidly and jointly, the relative orientation M23 of the fixed second element D2 of the posture detection subsystem DDP relative to the attitude inertial device D3, and the relative orientation M12 of the display D0 relative to the tracking first element D1 of the posture detection subsystem DDP.

The dual harmonization subsystem 34 is configured to implement the dual harmonization method according to the invention in all the embodiments described hereinbelow.

Figure 2:
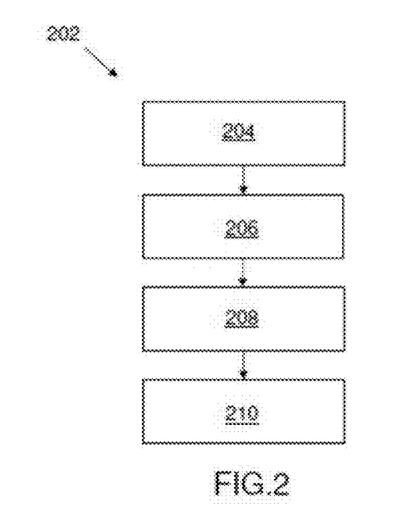
FIG. 2 is a flow diagram of a dual harmonization method according to the invention for making the display of piloting information of an aircraft on the display of the worn head-up display system of FIG. 1 conform with the outside real world.

According to FIG. 2, a dual harmonization method 202 for a worn head-up display system for making the display of piloting information on a display conform with the outside real world comprises:

a first step 204 of provision of an augmented inertial equipment item D3p+ securely incorporating, in one and the same assembly, the attitude inertial device D3 of the aircraft, the aircraft positioning device Dp, and a camera for taking one or more photos of the outside real world, the reference frame of the camera being assumed aligned on the reference frame of the attitude inertial device D3 of the aircraft;

a second step 206 of acquisitions of measurements $\hat{K}_\iota$ in which a series of an integer number N, greater than or equal to 3, of different sightings Vi are performed, i varying from 1 to N, performed through the semi-transparent display D0, by aligning, with the outside real world, different images of rank i, denoted image(i), fixed on said display D0, and each representing one and the same photo, taken before the first sighting V1 by the camera of the augmented inertial equipment item D3p+, seen with a predetermined different angular orientation Oi, expressed in terms of three Euler angles of bearing, pitch and roll, corresponding to a matrix M(image(i)/0) from the reference frame "image(i)" of the image of rank i to the reference frame "0" of the display D0, and in which, for each sighting Vi performed, i varying from 1 to N, the posture detection subsystem DDP measures and determines the corresponding relative orientation $\hat{K}_\iota$ of the tracking first element D1 relative to the fixed second element D2, linked to the platform of the aircraft; then a third step 208 in which the harmonization computer computes the matrix of relative orientation M01 between the display D0 in a tilted position and the tracking first element D1 and the matrix of relative orientation M23 between the fixed second element D2 of the posture detection subsystem DDP and the attitude inertial device D3 as, respectively, the right matrix $\hat{D}$ and the left matrix $\hat{G}$, joint solutions of the harmonization system of equations:

$\hat{U}_i = \hat{G} \cdot \hat{K}_i \cdot \hat{D}$, i varying from 1 to N, in which $\hat{U}_\iota$ is the transpose of the matrix M(image(i)/0); then then an optional fourth step 210.

The first step 204 is a step prior to the implementation of the dual harmonization method 202, performed once and for all.

The second and third steps 206, 208 are executed each time the augmented inertial equipment item D3p+ is moved in the cockpit and re-installed.

The second and third steps 206, 208 are executed to know, on the one hand, the relative orientation M23 between the fixed element D2 of the posture detection subsystem DDP and the augmented inertial equipment item D3p+, and, on the other hand, the relative orientation M01 of the display D0 relative to the mobile tracking first element D1 of the posture detection subsystem DDP.

Advantageously, the duration of the second and third steps, 206 and 208, executed in succession, is extremely short and is not detrimental to the effectiveness of the operations.

The optional fourth step 210 is executed only once upon the installation of the fixed second element D2 of the posture detection subsystem which remains attached to the platform of the aircraft, for example that of a helicopter. This fourth step 210 is executed to know the relative orientation M2pl of the fixed second element D2 of the posture detection subsystem relative to the platform. Advantageously, this fourth step is relatively short and makes the installation of the head-up display system on the platform very effective.

Thus, when the platform is commissioned, the module D3p+ can be moved and repositioned in total freedom.

During the second step 206, once the augmented inertial equipment item D3p+ is fixed on the platform of the aircraft, in a position allowing the camera to see the landscape, preferably to the front of the cockpit but not necessarily, a photograph of the landscape, i.e. of the outside real world, is taken by the camera.

Then, during the same second step 206, for i varying from 1 to N, N being an integer greater than or equal to 3, the dual harmonization computer displays, on the display D0, a fixed image of rank i, denoted image(i) representing the photo taken seen with a predetermined angular orientation Oi, characterized by three Euler angles, of bearing, pitch, roll, respectively denoted bearing(Oi), pitch(Oi), roll(Oi), and corresponding to a matrix of transformation of the matrix M(image(i)/0) of the reference frame "image(i)" of the image of rank i to the reference plane "0" of the display D0. By a corresponding sighting Vi, the operator aligns the image of rank image(i), seen in the display D0, on the corresponding landscape of the outside real world seen through the display D0, and, once the alignment is done, the operator presses a button of the IHS commanding the harmonization computer to save the corresponding orientation, Vi or Im $\hat{K}_\iota$, of the mobile tracking first element D1 relative to the fixed second element D2, measured by the posture detection subsystem DDP.

For each i varying from 1 to N, when the operator "aligns" the image(i) perceived in the display D0 on the outside real landscape, that amounts to giving the image the same orientation as the camera. The matrix of transition from the reference frame "image(i)" of the image of rank i to the reference frame "c" of the camera, denoted M(image(i)/c), is, at that moment, equal to the identity matrix.

As was indicated previously, the camera is considered to be oriented identically to the attitude inertial device D3 of the augmented inertial equipment item D3p+. For each i, i varying from 1 to N, the following matrix equations are satisfied:

$M(i/c) = M(i/3) = Id3 = M(0/3)_i * M(i/0)$ with $M(i/0)$ known.

Thus, for each i, i varying from 1 to N, the relative orientation of the display D0 relative to the attitude inertial device D3p, denoted by the rotation matrix $M(0/3)_i$, can be determined according to the relationship:

$M(0/3)_i = \text{transpose}[M(i/0)]$.

Thus, the equation: $M(0/3)_i = M(2/3) * M(1/2)_i * M(0/1)$ is a dual harmonization equation in which M(0/3), is known for each orientation direction Oi, i varying from 1 to N, and $M(1/2)_i$, that is to say $\hat{K}_\iota$, is determined by the corresponding sighting direction Vi.

There is then a series of four known orientations O0, O1, O2, O3 of the display D0 relative to the device D3 supplying the attitude of the device and four corresponding measured sightings V0, V1, V2, V3.

The conditions for solving a dual harmonization problem are fulfilled as described in the patent application entitled "Dual harmonization method for a posture detection subsystem DDP incorporated in a worn head-up display system" and filed on the same date as the present application.

Here, the matrix M(2/3) corresponds to the correction matrix $\hat{G}$ on the left and the matrix M(0/1) corresponds to the correction matrix $\hat{D}$ on the right.

The dual harmonization method makes it possible, simply by computation, to align with one another all the devices of the display system 2 by implementing the third step 208.

The minimum of the number of measurements N required depends on the number L of degrees of angular freedom of the rotations M01 and M3t of the display system HMD that are errored or unusable, said number being an integer greater than or equal to 1 and less than or equal to 6.

The solving of the system of equations $\hat{U}_i = \hat{G} \cdot \hat{K}_i \cdot \hat{D}$, i varying from 1 to N, uses a rectification operator π(.) which transforms any matrix A into a 3×3 square matrix of rotation π(A) that is as close as possible to the least squares sense over all of the terms of the matrix π(A)−A over all of the 3×3 rotation matrices, to determine the rotation to the right $\hat{D}$ and the rotation to the left $\hat{G}$.

Figure 3:
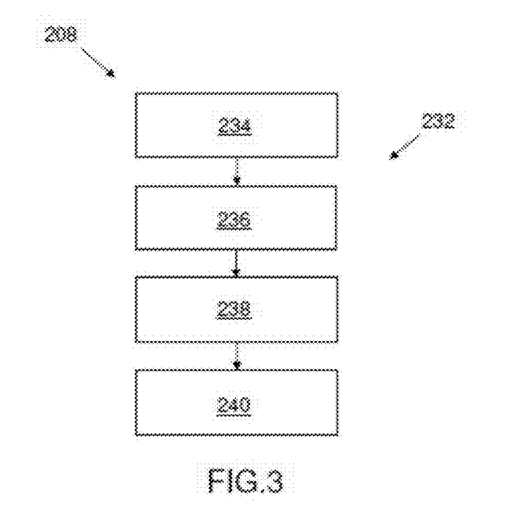
FIG. 3 is a detailed flow diagram of the third step of the joint dual harmonization method of FIG. 2.

According to FIG. 3, it is assumed that the number of degrees of angular freedom L of the rotations M01 and M3t is between 1 and 6, and the total number N of measurements is greater than or equal to 3.

The third step 208 of solving of the dual harmonization system of equations comprises a first set 232 of substeps consisting in:

in a first substep 234, choosing a "pivot" measurement as being the first measurement out of the N measurements and corresponding to i equal to 1, and for i=2, ..., N, the rotation matrices $\hat{U}_{1,i}$ and $\hat{K}_{1,i}$ are computed using the equations: $\hat{U}_{1,i} = \hat{U}_1^T \cdot \hat{U}_i$ and $\hat{K}_{1,i} = \hat{K}_1^T \cdot \hat{K}_i$; then in a second substep 236, determining, for i=2, ..., N, the main unitary vectors of the rotations $\hat{U}_{1,i}$ and $\hat{K}_{1,i}$, respectively denoted $\vec{u}_i$ and $\vec{K}_i$; then in a third substep 238, computing the right matrix $\hat{D}$, i.e. M01, using the equation:

$$\hat{D} = \pi\left(\sum_{i \geq 2}(\vec{k}_i \cdot \vec{u}_i^T)\right)$$

then in a fourth substep 240, determining the matrix of rotation to the left $\hat{G}$; i.e. M23, from the matrix $\hat{D}$ computed in the third substep 318, using the equation:

$$\hat{G} = \pi\left(\sum_{i \geq 1}(\hat{U}_i \cdot \hat{D}^T \cdot \hat{K}_i^T)\right)$$

The second and third steps 206 and 208 do not thus far alone make it possible to know the relative orientation of the platform relative to the inertial device D3 of the augmented inertial equipment item D3p+. The augmented inertial equipment item D3p+ does not therefore make it possible, at this stage, to display, in the display D0, information relating to the attitude of the platform in terms of heading, pitch, roll.

To this end, the fourth step 210 can be implemented provided that the relative orientation M2pl of the fixed second element D2 relative to the platform is fixed as a function of time, which is generally the case.

This fourth step 210 has the great advantage of not requiring means specific to the head-up display system to perform the harmonization of the attitude inertial device D3.

This fourth step 210 also has the advantage of not requiring a very powerful attitude inertial device D3 in as much as its heading data are not used during this fourth step 210 of harmonization of the attitude inertial device D3. These heading data are indeed often inaccurate in the absence of movement of the platform.

Figure 4:
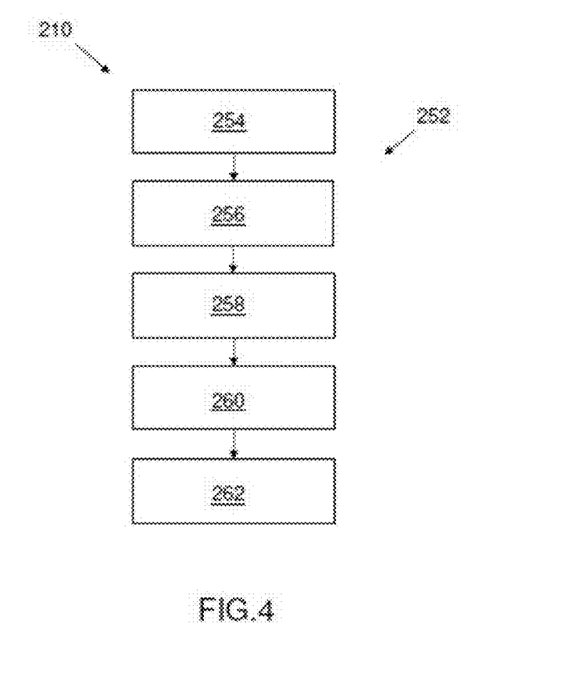
FIG. 4 is a detailed flow diagram of the fourth step of the joint dual harmonization method of FIG. 2.

The fourth step 210 of determination of the relative orientation M(pl/3) of the platform of the aircraft relative to the attitude inertial device D3 comprises a second set 252.

In a fifth substep 254, the platform of the aircraft is placed horizontal. For that, the platform has a level zone on which the level can be raised. A matrix M(pl1/3) for which the relative heading is unknown for compensating relative pitch and roll angles between the attitude inertial device D3 and the platform is computed such that: M(3/t)*M(pl1/3)=M(p/t), M(p/t) being a matrix of theoretical relative orientation of the platform relative to the Earth comprising only a bearing component and for which the pitch angle and the roll angle are nil, and M(3/t) is a matrix of relative orientation of the platform relative to the Earth measured by the attitude inertial device D3.

Then, in a sixth substep 256, the bearing of a point of note in the landscape, situated far in front of the camera 52 and whose latitude and longitude are known, relative to the inertial device 30 D3, is determined by using the camera 52.

The sixth substep 256 consists in:

taking a photograph by the camera 52 and transferring the photograph to the harmonization computer, then processing the photograph by noting the position of the point of note, and by determining the bearing of the point of note relative to the camera, and therefore relative to the attitude inertial device D3, from the knowledge of the pitch and of the roll supplied by the attitude inertial device, and from the knowledge of the matrix of relative orientation M(pl/3) of the platform of the aircraft relative to the attitude inertial device D3.

Then, in a seventh substep 258, the bearing of the point of note relative to the platform is determined from the knowledge of the latitude and longitude of the point of note, from the latitude and the longitude of the platform, and from the angle of the heading of the platform supplied by a means for accurately supplying the heading of the platform, available at the time of implementation of the fourth step 210.

Then, in an eighth substep 260, the bearing of the attitude inertial device D3 relative to the platform is deduced therefrom and the matrix M(pl1/3) is added to to obtain the matrix M(pl/3) giving the relative orientation of the attitude inertial device D3 relative to the platform of the aircraft.

Then, in a ninth substep 262, the relative orientation of the fixed second element D2 of the posture detection subsystem DDP relative to the platform is determined from the relative orientation M23 of the fixed second element D2 of the posture detection subsystem DDP relative to the attitude inertial device D3, supplied by the third step 208, and from the matrix M(pl/3) giving the relative orientation of the attitude inertial device D3 relative to the platform, supplied by the seventh substep 258.

According to a particular embodiment, in the sixth substep 256, the platform is positioned, horizontally, on a compass card generally available over an aviation terrain, and the platform is positioned such that a point of note in the landscape, situated far from the compass card and for which the latitude and the longitude are known, is in view of the camera 52 of the augmented inertial equipment item D3p+.

According to the same embodiment, in the seventh step 258, the angle of the heading of the platform is supplied by reading the compass card.

This knowledge of the relative orientation M2pl of the fixed second element D2 relative to the platform then makes it possible to remove the augmented inertial equipment item D3p+ and reposition it at will. It is sufficient to perform the second and third steps 206, 208 described above to obtain all the relative orientations of the equipment items forming the head-up display system 2 and for making full use of the head-up display system.

The head-up display system and the dual harmonization method make it possible to use a head-up display system that has an attitude inertial device that can easily be moved and repositioned.

The addition of a camera secured to the attitude inertial device D3 to form an integrated augmented inertial equipment item D3p+ and the use of a dual harmonization algorithm make it possible to rapidly and accurately perform the necessary harmonizations of all of the elements of the head-up display system and allow for an effective use of said head-up display system.

Advantageously, the harmonization method according to the invention can be performed in a very short time, typically one minute, which does not affect the operational value of the head-up display system.

The dual harmonization method according to the invention also makes it possible to harmonize the attitude inertial device D3 on the platform and to display, in the head-up display system, the platform attitude information.

The dual harmonization method for the constituent elements of the head-up display system is a simple method, that can be performed in a minimum of three sightings, which uses no means external to the installed system.

The invention claimed is:

1. A dual harmonization method for a worn head-up display system configured to display piloting information of an aircraft on a display to conform with an outside real world,
the worn head-up display system comprising:
a semi-transparent worn head-up display,
a head posture detection subsystem having a mobile tracking first element securely attached to the semi-transparent worn head-up display, a fixed second element securely linked to a platform of the aircraft, and a measurement device configured for measuring and determining a relative orientation M12 of the mobile tracking first element relative to a reference frame of the fixed second element linked to the platform,
an attitude inertial device for supplying a relative attitude M3t of the platform relative to a terrestrial reference frame linked to the Earth, that is removable and that can be securely fixed to the platform on a windshield of a cockpit for any period of operation of the aircraft, and
a harmonization sub-system for the worn head-up display system configured to display piloting information on the worn head-up display to conform with the outside real world, the harmonization sub-system having a dual harmonization computer and a human-system interface for managing and performing an implementation of the dual harmonization method,
the dual harmonization method comprising:
a first step of provision of an augmented inertial equipment item securely incorporating, in one and a same assembly, the attitude inertial device of the aircraft, and a camera for taking one or more photos of the outside real world, the camera and the attitude inertial device of the aircraft being securely linked;
a second step of acquisition of measurements $\hat{K}_t$, in which a series of an integer number N, greater than or equal to 3, of different sightings Vi are performed, i varying from 1 to N, performed through the semi-transparent worn head-up display, by aligning with the outside real world different images of rank i, denoted by image(i), fixed on said semi-transparent worn head-up display, and each representing one and the same photo, taken before a first sighting V1 by the camera of the augmented inertial equipment item, seen with a predetermined different angular orientation Oi, expressed in terms of three Euler angles of bearing, pitch and roll, corresponding to a matrix M(image(i)/0) from a reference frame "image(i)" of the image of rank i to a reference frame "0" of the semi-transparent worn head-up display, and in which, for each sighting Vi performed, i varying from 1 to N, a posture detection subsystem measures and determines the corresponding relative orientation $\hat{K}_t$ of the mobile tracking first element relative to the fixed second element, linked to the platform of the aircraft; then
a third step in which the dual harmonization computer jointly computes the matrix of relative orientation M01 between the semi-transparent worn head-up display in a tilted position and the mobile tracking first element and a matrix of relative orientation M23 between the fixed second element of the posture detection subsystem and the attitude inertial device, as respectively, a right matrix $\hat{D}$ and a left matrix $\hat{G}$, joint solutions of system of harmonization equations: $\hat{U}_i = \hat{G} \cdot \hat{K}_i \cdot \hat{D}$, i varying from 1 to N, in which $\hat{U}_t$ is a transpose of the matrix M(image(i)/0).

2. The dual harmonization method for a worn head-up display system according to claim 1, wherein:
a minimum of a number of measurements N required depends on a number L of degrees of angular freedom of the rotations M01 and M3t of the display system HMD that are errored or unusable, said number L being an integer greater than or equal to 1 and less than or equal to 6, and
the solving of the system of equations $\hat{U}_i = \hat{G} \cdot \hat{K}_i \cdot \hat{D}$, i varying from 1 to N, uses a rectification operator $\pi(.)$ which transforms any matrix A into a 3×3 square matrix of rotation $\pi(A)$ that is as close as possible to the least squares sense over all the terms of the matrix $\pi(A)-A$ over all of the 3×3 rotation matrixes to determine the rotation to the right $\hat{D}$ and the rotation to the left $\hat{G}$.

3. The dual harmonization method for a worn head-up display system according to claim 2, wherein:
the number N is greater than or equal to 3, and
the third step of solving of the dual harmonization system of equations comprises a first set of substeps consisting in:
in a first substep, choosing a "pivot" measurement as being the first measurement out of the N measurements and corresponding to i equal to 1, and for i=2, . . . , N the rotation matrices $\hat{U}_{1,i}$ and $\hat{K}_{1,i}$ are computed using the equations: $\hat{U}_{1,i} = \hat{U}_1^T \cdot \hat{U}_i$ and $\hat{K}_{1,i} = \hat{K}_1^T \cdot \hat{K}_i$; then
in a second substep determining, for i=2, . . . , N, the main unitary vectors of the rotations $\hat{U}_{1,i}$ and $\hat{K}_{1,i}$, denoted respectively by $\vec{u}_i$ and $\vec{k}_i$; then
in a third substep, computing the right matrix $\hat{D}$, i.e. M01, using the equation:

$$\hat{D} = \pi\left(\sum_{i \geq 2} (\vec{k}_i \cdot \vec{u}_i^T)\right)$$

then
in a fourth substep, determining the left rotation matrix $\hat{G}$; i.e. M23, from the matrix $\hat{D}$ computed in the third substep, using the equation:

$$\hat{G} = \pi\left(\sum_{i \geq 1}(\hat{U}_i \cdot \hat{D}^T \cdot \hat{K}_i^T)\right).$$

4. The dual harmonization method for a head-up display system according to claim 1,
wherein the worn head-up display system also comprises an aircraft positioning device Dp; and
comprising a fourth step of determination of the relative orientation M(pl/3) of the platform of the aircraft relative to the attitude inertial device,
the fourth step of determination of the relative orientation M(pl/3) comprising a second set of substeps consisting in:
in a fifth substep, placing the platform of the aircraft horizontal and computing a matrix M(pl1/3) whose relative bearing is unknown for compensation of the relative pitch and roll angles between the attitude inertial device and the platform such that: M(3/$t$)*M(pl1/3)=M(p/t),
M(p/t) being a matrix of theoretical relative orientation of the platform relative to the Earth including only a bearing component and for which the pitch angle and the roll angle are nil, and
M(3/$t$) being a matrix of relative orientation of the platform relative to the Earth measured by the attitude inertial device; then
in a sixth substep determining the bearing of a point of note in the landscape, situated far in front and in view of the camera and for which the latitude and the longitude are known, relative to the attitude inertial device by using the camera of the augmented inertial device,
by taking a photograph with the camera and transferring the photograph to the harmonization computer, then
by processing the photograph by noting the position of the point of note, and by determining the bearing of the point of note relative to the camera, and therefore relative to the attitude inertial device, from the knowledge of the pitch and of the roll provided by the attitude inertial device, and the knowledge of the matrix of relative orientation M(pl/3) of the platform of the aircraft relative to the attitude inertial device; then
in a seventh substep, determining the bearing of the point of note relative to the platform from the knowledge of the latitude and longitude of the point of note, the latitude and the longitude of the platform and the angle of the heading of the platform provided by a means for accurately providing the heading of the platform;
in an eighth step deducing therefrom the bearing of the attitude inertial device relative to the platform, adding to the matrix M(pl1/3) to obtain the matrix M(pl/3) giving the relative orientation of the attitude inertial device relative to the platform of the aircraft; then
in a ninth substep, determining the relative orientation of the fixed second element of the posture detection subsystem relative to the platform from the relative orientation M23 of the fixed second element of the posture detection subsystem relative to the attitude inertial device, supplied by the third step, and from the matrix M(pl/3) giving the relative orientation of the attitude inertial device relative to the platform, supplied by the seventh substep.

5. The dual harmonization method for a worn head-up display system according to claim 4, wherein:
the sixth substep comprises:
positioning the horizontally-placed platform on a compass card and positioning the platform such that a point of note in the landscape, situated far from the compass card and for which the latitude and the longitude are known, is in view of the camera of the augmented inertial equipment item, taking a photograph with the camera and transferring the photograph to the harmonization computer, then
processing the photograph by noting the position of the point of note, and by determining the bearing of the point of note relative to the camera and therefore relative to the attitude inertial device, from the knowledge of the pitch and the roll supplied by the attitude inertial device, and from the knowledge of the matrix of relative orientation M(pl/3) of the platform of the aircraft relative to the attitude inertial device; and
the seventh substep consists in determining the bearing of the point of note relative to the platform from the knowledge of the latitude and longitude of the point of note, from the latitude and the longitude of the platform and from the angle of heading of the platform read on the compass card.

6. A worn head-up display system configured to display piloting information of an aircraft on a display to conform with an outside real world, comprising:
a transparent worn head-up display,
a head posture detection subsystem having a mobile tracking first element securely attached to the transparent worn head-up display, a fixed second element securely linked to a platform of the aircraft, and a measurement device configured for measuring and determining a relative orientation M12 of the mobile tracking first element relative to a reference frame of the fixed second element linked to the platform,
an attitude inertial device for supplying a relative attitude M3$t$ of the platform relative to a terrestrial reference frame linked to the Earth, that is removable and that can be fixed securely to the platform on a windshield of a cockpit for any period of operation of the aircraft,
a dual harmonization subsystem for the worn head-up display system configured to display piloting information on the transparent worn head-up display to conform with the outside real world, the dual harmonization subsystem having a dual harmonization computer and a human-system interface for managing and performing an implementation of dual harmonization,
the worn head-up display system being wherein:
the dual harmonization subsystem also comprises a camera for taking one or more photos of the outside real world, and the attitude inertial device of the aircraft, and the camera are incorporated together in a augmented inertial equipment item, the augmented inertial equipment item configured to be moved and configured to be fixed rapidly and easily, and the camera and the attitude inertial device of the aircraft being securely linked.

7. The worn head-up display system for making the display of piloting information of an aircraft on a display conform with the outside real world according to claim 6, in which the dual harmonization subsystem is configured to:
in a second step of acquisition of measurements $\hat{K}_i$, perform a series of an integer number N, greater than or equal to 3, of different sightings Vi, i varying from 1 to N, through the semi-transparent display D0, by aligning with the outside real world different images of rank i, denoted by image(i), fixed on said display, and each representing one and the same photo, taken before the first sighting V1 by the camera of the augmented inertial equipment item, seen with a predetermined different angular orientation Oi, expressed in terms of three Euler angles of bearing, pitch and roll, corresponding to a matrix M(image(i)/0) from the reference frame "image(i)" of the image of rank i to the reference frame "0" of the display, and, for each sighting Vi performed, i varying from 1 to N, measure and determine, via the posture detection subsystem, the corresponding relative orientation $\hat{K}_t$ of the tracking first element relative to the fixed second element, linked to the platform of the aircraft; then in a third step, computing, using the dual harmonization computer, the matrix of relative orientation M01 between the display in a tilted position and the tracking first element and the matrix of relative orientation M23 between the fixed second element of the posture detection subsystem and the attitude inertial device as, respectively, the right matrix $\hat{D}$ and the left matrix $\hat{G}$ joint solutions of the dual harmonization system of equations: $\hat{U}_i = \hat{G} \cdot \hat{K}_i \cdot \hat{D}$, i varying from 1 to N, in which $\hat{U}_i$ is the transpose of the matrix M(image(i)/0).

8. The worn head-up display system for making the display of piloting information of an aircraft on a display conform with the outside real world according to claim 7, in which:

the minimum of the number of measurements N required depends on the number L of degrees of angular freedom of the rotations M01 and M3t of the display system HMD that are errored or unusable, said number L being an integer greater than or equal to 1 and less than or equal to 6, and the dual harmonization computer is configured to solve the system of equations $\hat{U}_i = \hat{G} \cdot \hat{K}_i \cdot \hat{D}$, i by varying from 1 to N, in the third step by using a rectification operator $\pi(.)$ which transforms any matrix A into a 3×3 square matrix of rotation $\pi(A)$ that is as close as possible to the least squares sense of all the terms of the matrix $\pi(A) - A$ over all the 3×3 rotation matrices to determine the rotation to the right $\hat{D}$ and the rotation to the left $\hat{G}$.

9. The worn head-up display system for making a display of piloting information of an aircraft on a display conform with the outside real world according to claim 7, in which:

the number N is greater than or equal to 3, and the third step of solving of the dual harmonization system of equations implemented by the harmonization computer comprises a first set of substeps consisting in:

in a first substep, choosing a "pivot" measurement as being the first measurement out of the N measurements and corresponding to i equal to 1, and for i=2, ..., N the matrices of rotations $\hat{U}_{1,i}$ and $\hat{K}_{1,i}$ are computed using the equations: $\hat{U}_{1,i} = \hat{U}_1^T \cdot \hat{U}_i$ et $\hat{K}_{1,i} = \hat{K}_1^T \cdot \hat{K}_i$; then in a second substep, i=2, ..., N, determining the main unitary vectors of the rotations $\hat{U}_{1,i}$ and $\hat{K}_{1,i}$, denoted respectively by $\vec{u}_i$ and $\vec{k}_i$; then in a third substep, computing the right matrix $\hat{D}$, i.e. M01, using the equation:

$$\hat{D} = \pi\left(\sum_{i \geq 2}(\vec{k}_i \cdot \vec{u}_i^T)\right)$$

then in a fourth substep, determining the matrix of rotation to the left $\hat{G}$; i.e. M23, from the matrix $\hat{D}$ computed in the third step, using the equation:

$$\hat{G} = \pi\left(\sum_{i \geq 1}(\hat{U}_i \cdot \hat{D}^T \cdot \hat{K}_i^T)\right).$$

10. The worn head-up display system for making the display of piloting information of an aircraft on a display conform with the outside real world according to claim 9, also comprising an aircraft positioning device Dp and in which the dual harmonization computer and the human-system interface of the harmonization subsystem are configured to implement a fourth step of determination of the relative orientation M(pl/3) of the platform of the aircraft relative to the attitude inertial device, the fourth step of determination of the relative orientation M(pl/3) comprising a second set of substeps consisting in:

in a fifth substep, placing the platform of the aircraft horizontal and computing a matrix M(pl1/3) for which the relative bearing is unknown for compensating relative pitch and roll angles between the attitude inertial device and the platform such that: M(3/t)*M(pl1/3)=M(p/t), M(p/t) being a matrix of theoretical relative orientation of the platform relative to the Earth comprising only a bearing component and for which the pitch angle and roll angle are nil, and M(3/t) is a matrix of relative orientation of the platform relative to the Earth measured by the attitude inertial device; then in a sixth substep determining the bearing of a point of note in the landscape, situated far in front and in view of the camera and for which the latitude and longitude are known, relative to the attitude inertial device by using the camera of the augmented inertial device, by taking a photograph with the camera and transferring the photograph to the harmonization computer, then by processing the photograph by noting the position of the point of note, and by determining the bearing of the point of note relative to the camera, and therefore relative to the attitude inertial device, from the knowledge of the pitch and of the roll supplied by the attitude inertial device, and from the knowledge of the matrix of relative orientation M(pl/3) of the platform of the aircraft relative to the attitude inertial device; then in a seventh substep, determining the bearing of the point of note relative to the platform from the knowledge of the latitude and longitude of the point of note, from the latitude and the longitude of the platform and from the angle of the heading of the platform supplied by a means for accurately supplying the heading of the platform;

in an eighth step deducing therefrom the bearing of the attitude inertial device relative to the platform, adding to the matrix M(pl1/3) to obtain the matrix M(pl/3) giving the relative orientation of the attitude inertial device relative to the platform of the aircraft; then in a ninth substep, determining the relative orientation of the fixed second element of the posture detection subsystem relative to the platform from the relative orientation M23 of the fixed second element of the posture detection subsystem relative to the attitude inertial device, supplied by the third step, and from the matrix M(pl/3) giving the relative orientation of the attitude inertial device relative to the platform, supplied by the seventh sub step.

11. The worn head-up display system for making the display of piloting information of an aircraft on a display conform with the outside real world according to claim 10, in which the sixth substep consists in:

positioning the horizontally-placed platform on a compass card and positioning the platform such that a point of note in the landscape, situated far from the compass card and for which the latitude and the longitude are known, is in view of the camera of the augmented inertial equipment item, taking a photograph with the camera and transferring the photograph to the harmonization computer, then processing the photograph by noting the position of the point of note, and by determining the bearing of the point of note relative to the camera and therefore relative to the attitude inertial device, from the knowledge of the pitch and the roll supplied by the attitude inertial device, and from the knowledge of the matrix of relative orientation M(pl/3) of the platform of the aircraft relative to the attitude inertial device; and the seventh substep consists in determining the bearing of the point of note relative to the platform from the knowledge of the latitude and longitude of the point of note, from the latitude and the longitude of the platform and from the angle of heading of the platform read on the compass card.

12. The worn head-up display system for making the display of pilot information of an aircraft on a display conform with the outside world according to claim 6, in which the augmented inertial equipment item comprises a fixing device of sucker type.

* * * * *